United States Patent [19]

Tanaka et al.

[11] 4,385,094
[45] May 24, 1983

[54] ETHYLENE-VINYL ALCOHOL HOLLOW FIBER MEMBRANE AND METHOD FOR THE PRODUCTION THEREOF

[75] Inventors: Taku Tanaka; Shuzo Yamashita; Hirokuni Tanii, all of Kurashiki; Akira Kubotsu, Soja; Syuji Kawai, Kurashiki, all of Japan

[73] Assignee: Kuraray Co., Ltd., Kurashiki, Japan

[21] Appl. No.: 142,228

[22] Filed: Apr. 21, 1980

[30] Foreign Application Priority Data

Apr. 30, 1979 [JP] Japan .................................. 54-53729

[51] Int. Cl.$^3$ ............................................. B29D 27/04
[52] U.S. Cl. .................................. 428/398; 210/500.2; 264/41; 264/185; 264/209.1; 264/561
[58] Field of Search .................. 264/185, 41; 428/398; 210/500.2

[56] References Cited

U.S. PATENT DOCUMENTS

| 3,975,478 | 8/1976 | Leonard | 264/41 |
| 4,071,454 | 1/1978 | Yamamoto et al. | 264/185 |
| 4,084,036 | 4/1978 | Leonard | 428/400 |
| 4,220,543 | 9/1980 | Yamashita | 264/41 |
| 4,234,431 | 11/1980 | Mishiro et al. | 264/49 |
| 4,240,993 | 12/1980 | Sun | 264/185 |
| 4,269,713 | 5/1981 | Yamashita et al. | 264/41 |
| 4,279,752 | 7/1981 | Sueoka et al. | 264/49 |

FOREIGN PATENT DOCUMENTS

| 1586563 | 2/1970 | France . | |
| 2300606 | 9/1976 | France . | |
| 2314215 | 1/1977 | France . | |
| 2324337 | 4/1977 | France . | |
| 2401949 | 3/1979 | France . | |
| 2435276 | 4/1980 | France . | |
| 31-8918 | 10/1956 | Japan | 264/185 |
| 37-5822 | 6/1962 | Japan | 264/185 |
| 43-16675 | 7/1968 | Japan | 264/185 |
| 50-35428 | 4/1975 | Japan | 264/167 |
| 51-96530 | 8/1976 | Japan | 264/185 |
| 52-21421 | 2/1977 | Japan | 264/173 |
| 52-152877 | 12/1977 | Japan | 264/185 |
| 53-86834 | 7/1978 | Japan . | |
| 1272800 | 5/1972 | United Kingdom . | |
| 1415768 | 11/1975 | United Kingdom . | |
| 1503270 | 3/1978 | United Kingdom . | |

Primary Examiner—Jay H. Woo
Attorney, Agent, or Firm—Barry Kramer

[57] ABSTRACT

There is provided a hollow fiber membrane of ethylene-vinyl alcohol copolymer which is produced by a process comprising extruding a spinning solution of an ethylene-vinyl alcohol copolymer in a solvent selected from the group consisting of dimethylsulfoxide, dimethylacetamide, pyrrolidone, N-methylpyrrolidone and mixtures thereof through a hollow fiber spinneret while a liquid coagulant is introduced into a central aperture of said spinneret, passing the spun fiber through a gaseous atmosphere in a manner such that the fiber is drawn 0.5 to 20 times its extrusion rate and then coagulating said fiber in a coagulating bath at a temperature within the range satisfying the following relationship:

when $15 \leq C \leq 40$, $\frac{1}{4}C + 20 \leq T \leq \frac{1}{4}C + 57$ wherein C denotes the copolymer concentration of the spinning solution (wt. %) and T denotes the coagulation temperature (°C.).

The coagulating liquid can be water or a mixture of the same solvent as that of said spinning solution with no less than 20 weight % of water.

10 Claims, 2 Drawing Figures

ETHYLENE-VINYL ALCOHOL HOLLOW FIBER MEMBRANE AND METHOD FOR THE PRODUCTION THEREOF

BACKGROUND OF THE INVENTION

1. Field of the Invention

This invention relates to a method of producing a hollow fiber membrane of ethylene-vinyl alcohol (EVA) copolymer. More particularly, this invention relates to a method of producing an EVA hollow fiber membrane having a uniform homogeneous porous structure by dry-wet spinning techniques.

2. Description of the Prior Art

A variety of hollow fiber membranes have been proposed as medical and industrial dialysis membranes and as ultrafiltration membranes. The present inventors have heretofore developed EVA copolymer hollow fiber membranes having satisfactory biocompatibility, improved durability and superior chemical stability, and have also developed an EVA hollow fiber membrane with a homogeneous structure.

The above EVA hollow fiber membrane, as disclosed in U.S. Pat. No. 4,134,837, displays excellent performance characteristics as a dialysis membrane and is being employed in artificial kidneys. The homogeneous EVA hollow fiber membrane is characterized by an inter-bonding of a plurality of particles having an average diameter of 100 to 10,000 Angstrom units and a substantial absence of voids sized in excess of $2\mu$.

Generally, in addition to the homogeneous membrane such as described above, there is also known an anisotropic membrane which has a skin or active layer. Most of the previously known anisotropic hollow fiber membranes have been manufactured from cellulose acetate and polyacrylonitrile; however, a few of the prior anisotropic membranes have been made from EVA polymer. Japanese Patent Application Laid Open No. 77883/53 (1978) discloses an EVA anisotropic membrane for use as a separator for storage batteries. This membrane comprises a dense layer having an average pore diameter no larger than 300 Angstrom units and a porous layer having an average pore diameter of 0.05 to $10\mu$. The membrane is manufactured by casting a polymer solution onto a glass plate, allowing it to stand in the air and, then coagulating it in a coagulation bath. This means that the above method provides only a flat sheet product and does not provide a hollow fiber membrane such as contemplated by this invention.

The present inventors conducted studies on the technology for producing various selectively permeable membranes, particularly hollow fibers, and have recognized that the production technology for a flat film and that for a hollow fiber involve quite different problems. By way of illustration, in the case of a hollow fiber membrane, the polymer solution is continuously extruded from a spinning nozzle and the fiber so formed must be coagulated and shaped into a membrane in a continuous sequence and in a limited period of time. This means that consideration must be paid not only to the membrane-forming ability of the polymer solution itself but also to a number of coagulation parameters and conditions. Furthermore, our research has shown that EVA copolymers are characterized by a large variation in membrane porosity according to coagulating conditions so that on EVA membranes, ranging in structure from those having a uniform micropore structure, which is the object of the present invention, to those having a porous supporting layer with a plurality of large vacuoles therein can be obtained.

Our studies on the above characteristics of EVA copolymers led to the instant invention which provides a new method for manufacturing a hollow fiber membrane having a uniform porous structure with good reproducibility.

SUMMARY OF THE INVENTION

This invention, therefore, relates to a method of producing an ethylene-vinyl alcohol hollow fiber membrane characterized by extruding a spinning solution of an ethylene-vinyl alcohol copolymer in a solvent selected from the group consisting of dimethylsulfoxide, dimethylacetamide, pyrrolidone, N-methylpyrrolidone and mixtures thereof through a hollow-fiber spinneret apparatus while a coagulating liquid is introduced into a central aperture of said spinneret, passing the spun fiber through a gaseous atmosphere so that the fiber is drawn to 0.5 to 20 times its extrusion rate and then coagulating the drawn fiber in a coagulation bath at a temperature within the range satisfying the following relaitionship:

$$\text{when } 15 \leq C \leq 40, \tfrac{1}{2}C+20 \leq T \leq \tfrac{1}{2}C+57$$

wherein C denotes the copolymer concentration (wt. %) of the spinning solution; T denotes the coagulation temperature (°C.).

DETAILED DESCRIPTION OF THE INVENTION

Figure 1:
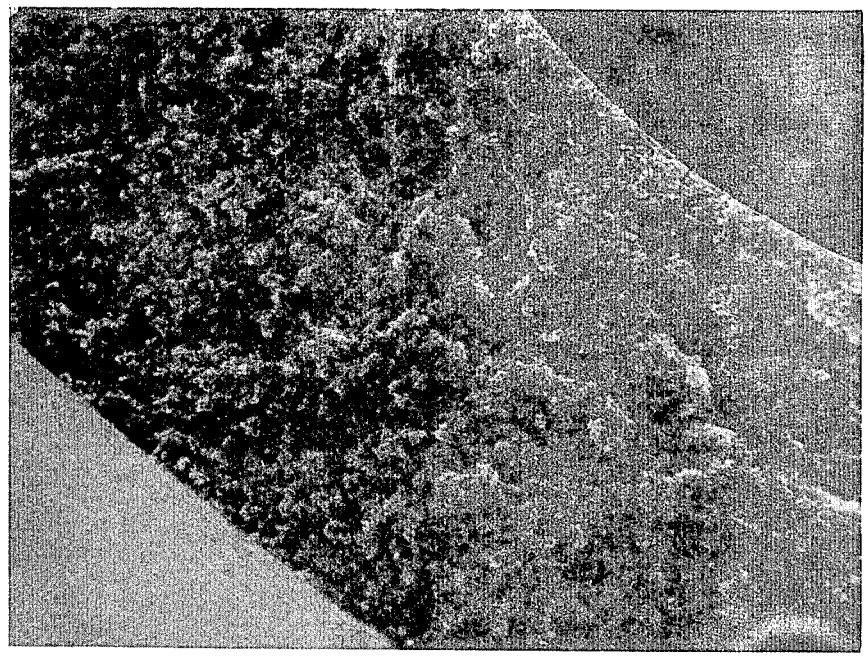
FIG. 1 is an electron photomicrograph (magnification x 1200) showing the cross-sectional structure of a hollow fiber membrane according to the present invention.

The EVA copolymer employed in accordance with this invention is a copolymer having an ethylene content of 10 to 90 mole percent, more preferably 10 to 60 mole percent, and having a viscosity of 1.0 to 50.0 centipoises as measured in a 3 weight percent solution thereof in dimethylsulfoxide (DMSO) at 30° C. The above copolymer may optionally contain, as additional copolymer units, less than about 15 mole percent of one or more other copolymerizable monomers. The said copolymerizable monomers include, for example, methacrylic acid, vinyl chloride, methyl methacrylate, acrylonitrile, and vinyl-pyrrolidone. This copolymer may also be such that crosslinkages have been introduced by treating said EVA copolymer, either before or after spinning, with an inorganic crosslinking agent such as a boron compound or an organic crosslinking agent such as a diisocyanate, dialdehyde or the like, or such that the functional hydroxyl groups in the vinyl alcohol units have been acetalized up to the extent of 30 mole percent with an aldehyde such as formaldehyde, acetaldehyde, butyaldehyde, benzaldehyde or the like.

The known solvents used for dissolving EVA copolymers include monohydric and polyhydric alcohols, e.g. methanol, ethanol, ethylene glycol, propylene glycol, etc., phenol, meta cresol, methyl pyrrolidone, formic acid, etc. and mixtures of such solvents with water.

However, for the purpose of manufacturing the hollow fiber membrane contemplated by this invention, it is preferable to employ dimethyl sulfoxide, dimethyl acetamide, pyrrolidone, N-methylpyrrolidone or mixtures thereof. Particularly desirable is dimethylsulfoxide, in which EVA copolymers are highly soluble. The concentration of the EVA copolymer in such a solvent is desirably in the range of 15 to 40 weight percent and, for still better results, in the range of 18 to 30 weight percent. The temperature of the copolymer solution may range from 0° to 120° C. and, preferably, from 20° to 80° C. At temperatures beyond the above upper limit, the copolymer can be degraded and at temperatures below the lower limit, the viscosity of the solution will be too high or the copolymer will undergo gelation thereby interfering with spinning.

The spinning solution prepared as above is extruded in the form of a hollow fiber through an appropriate spinneret for hollow fiber production such as an annular nozzle. In the practice of this invention, the copolymer solution is extruded from said spinneret while a coagulating liquid having the ability to coagulate the copolymer solution is constantly introduced into a central aperture of the spinneret. The coagulation of the inner surface of the resultant hollow fiber by said coagulating liquid plays an important role in the formation of the membrane, particularly in the development of the structure of the microporous layer and a dense and active layer on the surface of the membrane.

As said coagulating liquid, either water alone or a mixture of water and one or more water-miscible organic solvents may be employed. An aqueous solution of a salt such as sodium sulfate may likewise be employed. However, it is particularly beneficial, in practicing this invention, to employ a solution containing the same solvent as that used in the spinning solution and 20 to 100 weight percent, preferably 45 to 100 weight percent, of water. The coagulating ability of such solutions is especially suited for the formation of the desired membrane structure.

The spun fiber extruded from the spinneret apparatus first passes through a gaseous atmosphere. Since the spun fiber remains fluid in this gaseous atmosphere, the true-roundness and uniform membrane thickness are retained while the fiber is drawn. While the spun fiber is thus subjected to drawing, the conditions of drawing also represent an important parameter in the production method of this invention. Generally, a higher draw ratio is desirable in order to ensure a true roundness and a uniform membrane thickness, especially a thin membrane. However, an excessively large draw ratio tends to cause pinholes and similar flaws in the product membrane. In accordance with this invention, the extruded fiber is drawn 0.5 to 20 times its extrusion rate and, preferably 1 to 15 times its original length in the gaseous atmosphere. The distance from the nozzle face to the surface of the coagulation bath is preferably about 10 to 500 mm.

The gaseous atmosphere is normally an open air space but a controlled evaporation from the spun fiber is desired, it may be a vapor phase from the coagulation bath or an independent source, or an atmosphere generated by a controlled flow of a gas, wherein such gaseous atmosphere is established by a cylindrical or otherwise optionally shaped enclosure means. The microstructure of a dense and active layer on the surface of the hollow fiber membrane if any, can be varied and controlled by selecting the proper conditions of this drawing operation.

The fiber is then guided into said coagulation bath in which it is coagulated. The composition and temperature of the coagulation bath can be selected respectively, from within broad ranges. However, we have found that the composition of the coagulating bath is desirabily the same as the composition of the coagulating liquid introduced into the inside of the fiber. Thus, it is preferably a mixture of water and the solvent used in the preparation of the spinning solution and more desirably, a mixture of dimethylsulfoxide and water. While the proportions of the components of the coagulation bath should be selected according to the composition of the coagulating liquid used and the coagulation temperature, they are normally selected by trial spinning from the range of 20 to 100 weight percent of water.

The coagulation temperature is another important condition in the production of the membrane structure contemplated by this invention and we have found that the copolymer concentration of the spinning solution (C, wt. %) and the temperature of the coagulation bath (T, °C.) must conform to a given relationship. Thus, they must satisfy the following relationship:

$$\text{when } 15 \leq C \leq 40, \tfrac{1}{4}C + 20 \leq T \leq \tfrac{1}{4}C + 57$$

The hollow fiber emerging from the coagulation bath is further treated, if necessary, by drawing between rollers, wet-heat drawing, wet heat treatment and the like, so as to adjust its membrane characteristics and mechanical properties. In addition, the fiber can be further treated so as to acetalize the vinyl alcohol units with a monoaldehyde such as formaldehyde, acetaldehyde, chloroacetaldehyde, benzaldehyde, or a dialdehyde such as glutaraldehyde, glyoxal, PVA dialdehyde, or to introduce ester crosslinkages by means of a diisocyanate such as phenylene diisocyanate, tolylene diisocyanate, or ether crosslinkages by means of epichlorohydrin, for instance. The crosslinking reaction with a dialdehyde such as glutaraldehyde is particularly desirable in that it contributes significantly to improvements in the resistance to heat and chemicals, strength and dimensional stability, of the resultant membrane.

The hollow fiber membrane according to this invention can be put to use as a wet membrane or as a dry membrane. The drying method can be any of the following procedures. The water contained in the hollow fiber is replaced with an organic solvent which is water-miscible and does not dissolve the polymers, e.g. acetone, methanol, or tetrahydrofuran, and, then, the organic solvent is removed by mild heating. As an alternative, the membrane can be impregnated with a polyhydric aliphatic alcohol such as ethylene glycol, diethylene glycol or glycerin and, thereafter, dried by heating at a relatively low temperature. As a further alternative, which is known as freeze-drying, the water-containing wet membrane is frozen with liquid nitrogen or the like and, then, the water is removed by use of sublimation under a reduced pressure.

The uniform porous EVA membrane obtainable by the method of this invention has a porous structure including a substantially uniform distribution of micropores with an average pore diameter of 0.1 to 10$\mu$, preferably 0.1 to 5$\mu$, and having a porosity of 60 to 90 percent. The membrane need not necessarily have a dense and active surface layer. A membrane having a dense active surface or skin has a good cut-off characteristic, while a membrane having no dense surface layer features a large flux. Although it is very difficult to define the microstructure of such dense and active surface layer, it has microfine gaps not greater than 500 Angstrom units as viewed in the dry state under the electron microscope.

Figure 2:
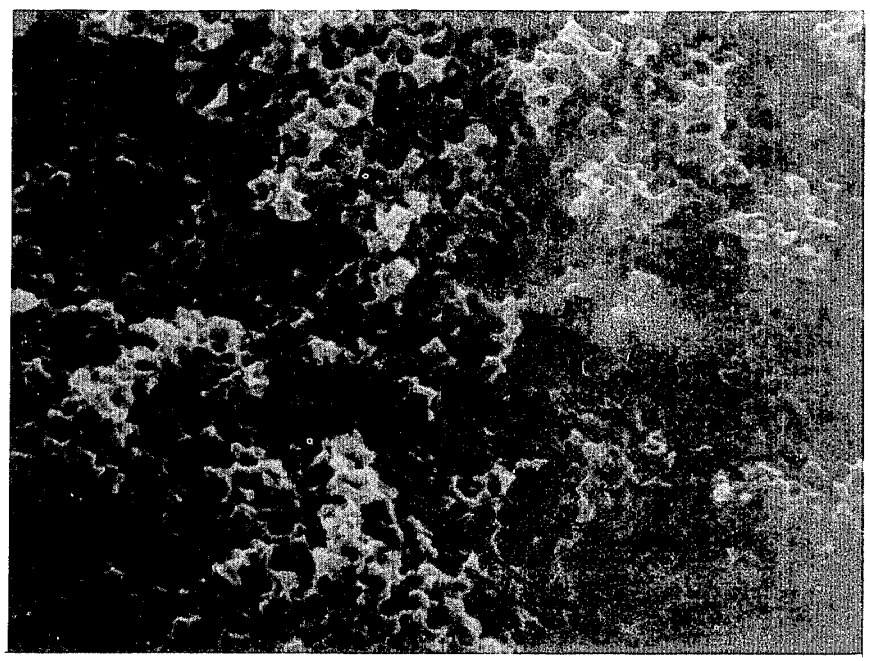
FIG. 2 is an electron photomicrograph (magnification x 12,000) showing the microstructure of the same hollow fiber membrane.

The cross-sectional structure of an example of the hollow fiber membrane according to this invention can be seen from the electron photomicrograph (magnification x 1200) of FIG. 1 and the microstructure of the same membrane can be seen from the electron photomicrograph (magnification x 12,000) of FIG. 2. To examine the structure of the membrane, the dry membrane is first frozen in liquid nitrogen and then broken to fracture which is then vapor-deposited with gold to a thickness of 100 Angstrom units and examined with an electron microscope, for example, Hitachi Model HFS-2, of Hitachi, Ltd.

The porosity can be calculated according to the following equation.

$$\left(1 - \frac{pa}{pr}\right) \times 100\ (\%)$$

pa: apparent specific gravity,
pr: true specific gravity

The hollow fiber membrane according to this invention is of about 40 to 3000μ, preferably about 100 to 2000μ in outside diameter, and about 10 to 1000μ, preferably about 20 to 500μ in membrane thickness. The membrane can be used as a filtering membrane in the separation and purification of various solutions or the separation and concentration of blood and other body fluids.

The following examples are further illustrative of this invention. Unless otherwise stated, all percentages and parts are by weight.

EXAMPLE 1

An EVA copolymer with an ethylene content of 33 mole % was dissolved in dimethylsulfoxide under heating to prepare a 22% (by weight) solution. The solution was defoamed by allowing it to stand at 70° C. overnight. An annular nozzle with a spinning orifice diameter of 1.5 mm, a needle outside diameter of 1.13 mm and a needle inside diameter of 0.87 mm was installed over a coagulation bath at a distance of 20 mm from the bath surface. While a mixture of dimethylsulfoxide and water (45:55, wt./wt.) was introduced into a central aperture of the spinneret at a rate of 1.3 cc/min., the above polymer solution was extruded through the annular nozzle at 1.1 cc/min. vertically down into the coagulation bath (29° C.) consisting of a solution made up of dimethylsulfoxide and water (60:40, wt./wt.). The spinning speed was 9.4 m/min. The wet hollow fiber thus obtained had an outside diameter of 670μ and a membrane thickness of 80μ. It was found to be a fiber having a substantially true-round cross-section and with no variation in diameter and thickness over one kilometer of its length.

The electron-microscopic structure of the above fiber was similar to those shown in FIGS. 1 and 2. The membrane had a water permeability (ultrafiltration rate) of 24.0 ml/cm². hr. atm, a permeability to urea of $202 \times 10^{-4}$ cm/min. and a $VB_{12}$ permeability of $117 \times 10^{-4}$ cm/min.

EXAMPLE 2

A hollow fiber membrane was manufactured in the same manner as Example 1 except that water was introduced through the central aperture of the nozzle and that water at 50° C. was used as the coagulation bath. The resultant wet hollow fiber had an outside diameter of 530μ a membrane thickness of 140μ, and a substantially true-round cross-section. The fiber had a UFR of 9.8 ml/cm² hr. atm, a urea permeability of $375 \times 10^{-4}$ cm/min. and a $VB_{12}$ permeability of $150 \times 10^{-4}$ cm/min.

EXAMPLES 3 to 5

Using a spinneret having an orifice diameter of 1.0 mm, a needle outer diameter of 0.6 mm and a needle inner diameter of 0.3 mm, hollow fibers were manufactured at a spinning speed of 10 m/min. The composition and temperature of the coagulation bath and certain other conditions were varied as indicated below in the table. Otherwise, the same conditions as those set forth in Example 1 were employed. The microstructures revealed by an electron microscope of all the resulting hollow fibers were similar to those shown in FIGS. 1 and 2, and could be used as filtering membranes.

| Example | (DMSO/H₂O) Coagulating liquid to be introduced into hollow fiber | Draw Ratio x/1 | Coagulation bath (DMSO/H₂O) | Coagulation temperature (°C.) | Outside diameter of hollow fiber and membrane thickness thereof (micron) | UFR (ml/cm² hr. atm) |
| --- | --- | --- | --- | --- | --- | --- |
| 3 | 45/55 | 2.3 | 20/80 | 30 | 595/86 | 40.85 |
| 4 | " | " | 40/60 | 26 | 575/88 | 27.48 |
| 5 | " | " | 0/100 | 33 | 585/108 | 42.74 |

What is claimed is:

1. An ethylene-vinyl alcohol copolymer hollow fiber membrane having a uniform microporous structure with an average pore diameter of 0.1 to 10 microns and a porosity of 60 to 90%, prepared by a process which comprises spinning a spinning solution of 15 to 40 weight percent of an ethylene-vinyl alcohol copolymer in a solvent selected from the group consisting of dimethyl-sulfoxide, dimethylacetamide, pyrrolidone, N-methylpyrrolidone and mixtures thereof through an annular nozzle while introducing a coagulating liquid into the central aperture of said nozzle, passing the spun fiber through a gaseous atmosphere so that the fiber is drawn to 0.5 to 20 times its extrusion rate and then coagulating the spun fiber in a coagulation bath at a temperature within the range satisfying the following relationship:

when $15 \leq C \leq 40,\ \frac{1}{2}C+20 \leq T \leq \frac{1}{2}C+57$ wherein C is the polymer concentration (weight %) of the spinning solution and T is the coagulation temperature (°C.).

2. An ethylene-vinyl alcohol copolymer hollow fiber membrane as defined in claim 1 wherein the ethylene content ranges from 10 to 90 mole percent.

3. An ethylene-vinyl alcohol copolymer hollow fiber membrane as defined in claim 1 additionally containing less than about 15 mole percent of at least one copolymerizable monomer.

4. An ethylene-vinyl alcohol copolymer hollow fiber membrane as defined in claim 1 which is crosslinked before or after spinning.

5. An ethylene-vinyl alcohol copolymer hollow fiber membrane as defined in claim 1 wherein up to 30 mole percent of the functional hydroxyl groups in the vinyl alcohol units have been acetalized.

6. An ethylene-vinyl alcohol copolymer hollow fiber membrane as defined in claim 1 having a dense and active surface layer.

7. An ethylene-vinyl alcohol copolymer hollow fiber membrane as defined in claim 1 having an outside diameter of from about 40 to 3000μ and a membrane thickness of from about 10 to 1000μ.

8. A method for producing an ethylene-vinyl alcohol copolymer uniform microporous hollow fiber membrane which comprises spinning a spinning solution of 15 to 40 weight % of an ethylene-vinyl alcohol copolymer in a solvent selected from the group consisting of dimethyl sulfoxide, dimethylacetamide, pyrrolidone, N-methylpyrrolidone and mixtures thereof through an annular nozzle while introducing a coagulating liquid into the central aperture of said nozzle, passing the spun fiber vertically downward through a gaseous atmosphere so that the fiber is drawn to 0.5 to 20 times its extrusion rate and then coagulating the spun fiber in a coagulation bath at a temperature within the range satisfying the following relationship:

when $15 \leq C \leq 40$, $\frac{1}{4}C + 20 \leq T \leq \frac{1}{4}C + 57$ wherein C is the polymer concentration (weight %) of the spinning solution and T is the coagulation temperature (°C.).

9. A method as defined in claim 8, wherein said coagulating liquid to be introduced into the central aperture of said nozzle is a solution of water and the same solvent as that of said spinning solution and the water content of the solution is not less than 20 weight %.

10. A method as defined in claim 8 wherein the spinning solution is maintained at a temperature ranging from 0° C. to 120° C.